(12) United States Patent  
Park et al.

(10) Patent No.: US 8,734,982 B2  
(45) Date of Patent: May 27, 2014

(54) HOLDER CASE AND BATTERY PACK HAVING THE SAME

(75) Inventors: Seok-Ryun Park, Suwon-si (KR); Sang-Joo Lee, Suwon-si (KR)

(73) Assignee: Samsung SDI Co., Ltd., Yongin-si, Gyeonggi-do (KR)

( * ) Notice: Subject to any disclaimer, the term of this patent is extended or adjusted under 35 U.S.C. 154(b) by 477 days.

(21) Appl. No.: 12/912,678

(22) Filed: Oct. 26, 2010

(65) Prior Publication Data

US 2011/0097607 A1 Apr. 28, 2011

(30) Foreign Application Priority Data

Oct. 26, 2009 (KR) .................. 10-2009-0101705

(51) Int. Cl.
*H01M 2/00* (2006.01)

(52) U.S. Cl.
USPC ............ 429/163; 429/162; 429/159; 429/154

(58) Field of Classification Search
USPC .................... 429/163, 154, 159, 162
See application file for complete search history.

(56) References Cited

U.S. PATENT DOCUMENTS 4,508,794 A * 4/1985 Wright .......................... 429/100
7,361,428 B2 * 4/2008 Watanabe et al. ............... 429/96

FOREIGN PATENT DOCUMENTS

| JP | 2008-258156 A | 10/2008 |
|----|---------------|---------|
| JP | 2009-110803 (A) | 5/2009 |
| KR | 10-2006-0027268 (A) | 3/2006 |
| KR | 10-0685115 B1 | 2/2007 |
| KR | 10-2008-0103652 (A) | 11/2008 |
| WO | WO 2008/047986 A1 | 4/2008 |

OTHER PUBLICATIONS

Korean Notice of Allowance dated Nov. 1, 2011 for Korean Patent Application No. KR 10-2009-0101705 which corresponds to captioned U.S. Appl. No. 12/912,678.

Korean Office Action dated Mar. 21, 2011 for Korean Patent Application No. KR 10-2009-0101705 which corresponds to the captioned application.

* cited by examiner

*Primary Examiner* — Jane Rhee (74) *Attorney, Agent, or Firm* — Knobbe, Martens, Olson & Bear, LLP (57) ABSTRACT

A holder case for a battery pack is disclosed. The holder case includes two pieces which are selectively engageable so that the length of the holder case can be varied.

17 Claims, 6 Drawing Sheets

HOLDER CASE AND BATTERY PACK HAVING THE SAME

CROSS-REFERENCE TO RELATED APPLICATIONS

This application claims priority to and the benefit of Korean Patent Application No. 10-2009-0101705, filed on Oct. 26, 2009, in the Korean Intellectual Property Office, the entire content of which is incorporated herein by reference.

BACKGROUND OF THE INVENTION

1. Field

The field relates to a holder case and a battery pack having the holder case.

2. Description of the Related Technology

A secondary battery is a battery which can be repeatedly charged and discharged. A secondary battery may, for example, be a nickel-cadmium (Ni—Cd) secondary battery, a nickel-hydrogen (Ni-MH) secondary battery, a lithium secondary battery, and the like. A lithium secondary battery may, for example, be a lithium ion secondary battery using a liquid electrolyte and a lithium polymer secondary battery using a polymer electrolyte, depending on the kind of electrolyte used. In addition, the lithium secondary battery may, for example, be a prismatic type, a cylinder type, a pouch type, and the like, depending on their shapes.

A battery pack using a lithium secondary battery typically includes a bare cell and a protection circuit board. The bare cell refers to a basic structure of the battery, including an electrode assembly, an electrolyte and an outer case in which the electrode assembly and the electrolyte are positioned. The protection circuit board protects the bare cell from overcharge or overdischarge when the bare cell is charged or discharged. The protection circuit board is also referred to as a protect circuit module (PCM).

SUMMARY OF CERTAIN INVENTIVE ASPECTS

One aspect is a holder case for a battery pack. The holder case includes a first holder case including a first connecting portion, and a second holder case including a second connecting portion selectively connected to the first connecting portion.

Another aspect is a battery pack. The battery pack includes a bare cell and a holder case connected to the bare cell. The holder case includes a first holder case including a first connecting portion, and a second holder case including a second connecting portion selectively connected to the first connecting portion. The battery pack also includes a protection circuit board connected to the holder case, and a cover frame connected to the holder case to cover the protection circuit board.

BRIEF DESCRIPTION OF THE DRAWINGS

The accompanying drawings, together with the specification, illustrate exemplary embodiments, and, together with the description, serve to explain various inventive principles.

DETAILED DESCRIPTION OF CERTAIN INVENTIVE EMBODIMENTS

In the following detailed description, only certain exemplary embodiments have been shown and described, simply by way of illustration. As those skilled in the art would realize, the described embodiments may be modified in various ways, without departing from the spirit or scope of the present invention. Accordingly, the drawings and description are to be regarded as illustrative in nature and not restrictive. In addition, when an element is referred to as being "on" another element, it can be directly on the other element or be indirectly on the other element with one or more intervening elements interposed therebetween. Also, when an element is referred to as being "connected to" another element, it can be directly connected to the other element or be indirectly connected to the other element with one or more intervening elements interposed therebetween. Hereinafter, like reference numerals generally refer to like elements. In the drawings, the thickness or size of layers may be exaggerated for clarity and are not necessarily drawn to scale.

Figure 1A:
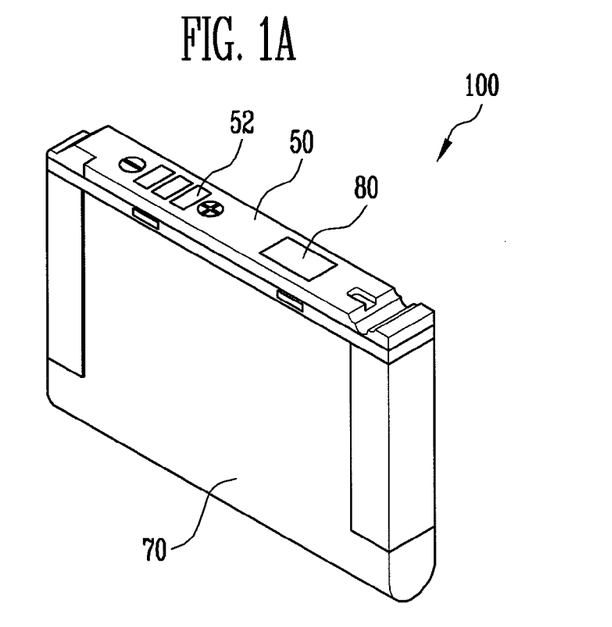
FIG. 1A is a perspective view of a battery pack according to an embodiment.
Figure 1B:
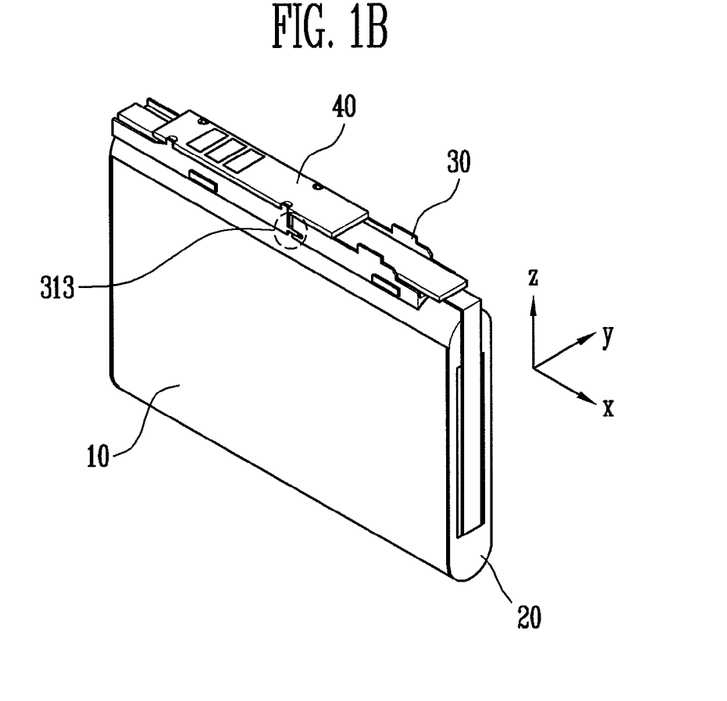
FIG. 1B is perspective view of the battery pack of FIG. 1A having its label removed therefrom.

FIG. 1A is a perspective view of a battery pack according to an embodiment. FIG. 1B is perspective view of the battery pack of FIG. 1A having its label removed therefrom.

Referring to FIGS. 1A and 1B, the battery pack 100 includes a battery or bare cell 10, a holder case 30 and a cover frame 50. The battery pack 100 may further include at least one of an insulator 20, a protection circuit board 40, a bottom insulator (see 60 of FIG. 2), a label 70 and a water sensitive paper 80.

In the battery pack 100 of this embodiment, the holder case 30 has a multi-step connection structure 313. The multi-step connection structure 313 operates so that the single holder case 30 can be disassembled into a plurality of holder case components and operates so that the plurality of holder case components are reassembled into the single holder case 30. The multi-step connection structure 313 functions so that the holder case 30 has a variable length in a length direction (x-direction) thereof. According to the configuration of the holder case 30, a single holder case can be used for bare cells having different lengths. Accordingly, assembly productivity can be improved, and manufacturing cost can be saved.

Figure 2:
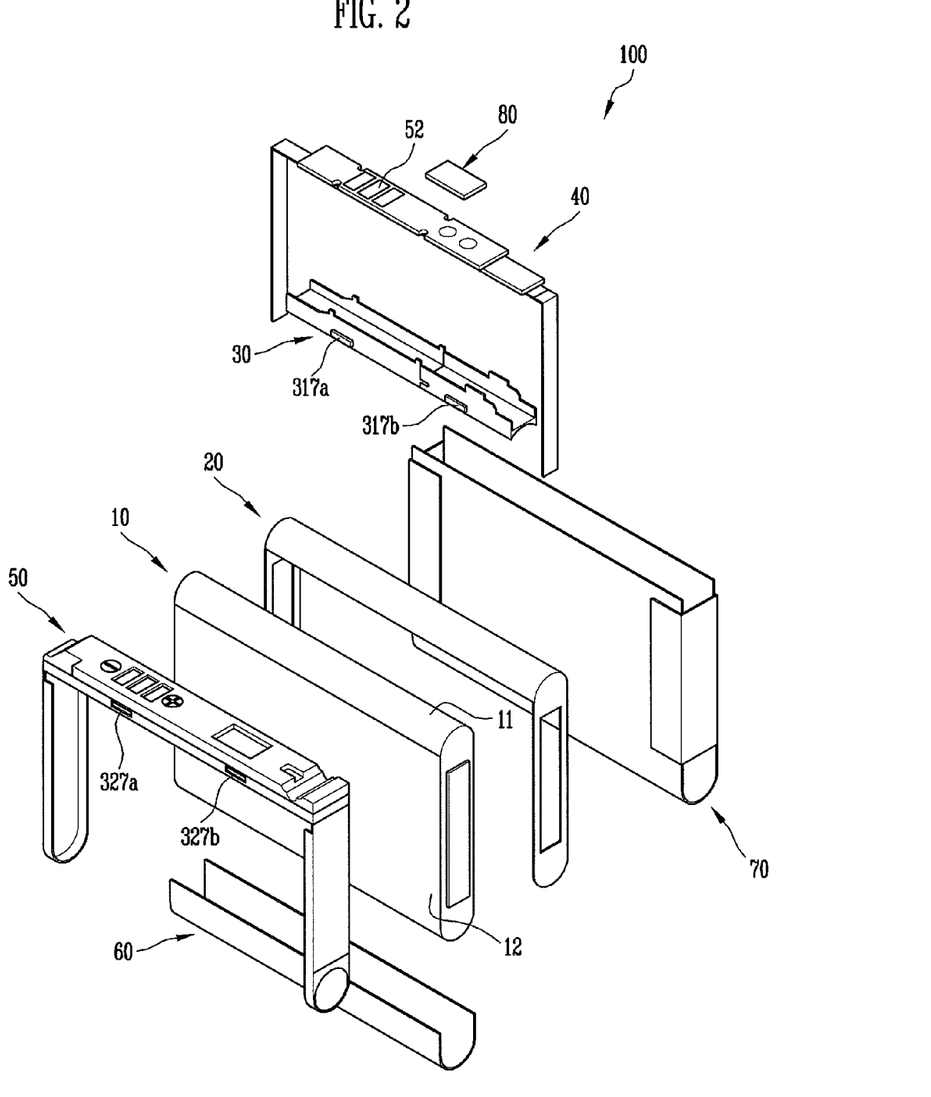
FIG. 2 is an exploded perspective view of the battery pack of FIG. 1A.

Hereinafter, the components and manufacturing process of the battery pack 100 will be described in a more detailed manner with reference to FIG. 2. FIG. 2 is an exploded perspective view of the battery pack of FIG. 1A.

Referring to FIG. 2, in this embodiment, the bare cell 10 is provided with two broad first sides opposite to each other and four narrow second sides connecting the two first sides. That is, the bare cell 10 has a roughly flat rectangular parallelepiped shape. The bare cell 10 has at least one of the four sides (second sides) formed in the shape of a curved surface 11. The bare cell 10 includes at least one lithium battery in which an electrode assembly and an electrolyte are accommodated in a metallic can or pouch outer case, for example.

For example, when a metallic can is used, the bare cell 10 may include a metallic can having a prismatic or elliptical top opening, an electrode assembly and an electrolyte in the metallic can, and a can assembly connected to the metallic can so to hermetically seal the top opening.

The electrode assembly may include a positive electrode plate, a negative electrode plate and a separator. The positive electrode plate may have a positive electrode collector and a positive electrode active material layer. The positive electrode collector may be formed of aluminum, and the positive electrode active material layer may be formed of a layered compound including lithium, a binder for improving a binding force and a conductive material for enhancing conductivity. The negative electrode plate may have a negative electrode collector and a negative electrode active material layer. The negative electrode collector may be formed of copper. The negative electrode active material layer may be formed of hard carbon or graphite containing carbon, and a binder for enhancing a bonding force between active material particles. A positive electrode tab and a negative electrode tab may be connected to the positive electrode plate and the negative electrode plate, respectively. The separator is interposed between the positive and negative electrode plates. The separator isolates the positive and negative electrode plates from each other and forms an electric charge path between the positive and negative electrode plates. The separator may be formed of, for example, polyethylene or polypropylene. When the electrolyte is a polymer, the separator may have pores.

The cap assembly may include a single- or multi-layered cap plate, an electrode plate connected to the cap plate, and a safety vent connected to the cap plate. Electrode terminals are connected to the positive and negative electrode tabs of the electrode assembly to form a current path between the electrode assembly and the exterior thereof. A gasket may be provided between the cap assembly and the metallic can.

For example, when a pouch outer case is used, the bare cell 10 may include an electrode assembly and a pouch for accommodating the electrode assembly and the electrolyte and allowing the positive and negative electrode tabs to be exposed to the exterior thereof. The positive and negative electrode tabs correspond to the electrode terminals electrically connected to the protection circuit board 40. The electrode assembly may be an electrode assembly accommodated in the aforementioned metallic can. The separator may contain a polymer electrolyte.

The insulator 20 and the bottom insulator 60 surround the bare cell 10 and allow the bare cell 10 to be isolated from conductive portions of other components in the battery pack 100. Each of the insulator 20 and the bottom insulator 60 may be provided with an adhesive layer on at least one surface thereof. Therefore, the insulator 20 and the bottom insulator 60 may be attached to the bare cell 10 by the adhesive layers in different operations of the assembling process, respectively. The bottom insulator 60 may be provided to protect one side of the bare cell 10 to which it is attached. The insulator 20 and the bottom insulator 60 may be formed of a resin such as polypropylene or polyethylene. It will be apparent that various existing insulating materials may be applied to the insulator of this embodiment. The insulator may be formed in various shapes, including the shape of the side of the bare cell 10.

The holder case 30 is connected to the bare cell 10 on one side formed in the shape of the curved surface 11 with the insulator 20 interposed therebetween. One surface of the holder case 30 (see 302 of FIG. 6B) has a curved shape to conform to the curved surface 11 of the bare cell 10. According to the connection of these curved surfaces, the connecting force between the holder case 30 and the bare cell 10 can be improved, and the assembling errors between the bare cell 10 and the holder case 30 and between the protection circuit board 40 and the cover frame 50 can be decreased. The holder case 30 may comprise at least one cover connecting portion for connection with the cover frame 50. For example, the cover connecting portion may include first and second cover connecting portions 317a and 317b, each formed as projections to be spaced apart from each other at a predetermined interval. The holder case 30 may be formed of a thermoplastic resin.

The protection circuit board 40 is electrically connected to positive and negative electrodes of the bare cell 10. The protection circuit board 40 is provided with an external terminal 52. The external terminal 52 may be exposed to the exterior of the protection circuit board 40 through holes. The protection circuit board 40 forms a current path between the bare cell 10 and an external system and controls charge and discharge operations of the bare cell 10. The protection circuit board 40 is provided to protect the bare cell 10 from overcharge, overdischarge, overcurrent, and the like. The protection circuit board 40 may be provided with first and second connecting portions (see 316a and 316b of FIG. 5) for connection with the holder case 30.

The cover frame 50 includes frames for covering sides of the bare cell 10 and protects the bare cell 10 from external impact. The cover frame 50 may be formed of a thermoplastic resin with strong elasticity and impact resistance, such as polyethylene or flame-retardant ABS resin. The cover frame 50 may be provided with at least one connecting portion for connection with the holder case 30. For example, the connecting portion of the cover frame 50 may include first and second connecting portions 327a and 327b formed as openings. The first and second connecting portions 327a and 327b are formed to be spaced apart from each other at a predetermined interval. The water sensitive paper 80 may be attached to an outer surface of the cover frame 50.

The label 70 is provided to surround one side opposite to the curved surface 11 of the bare cell 10 and the first sides including a broad side 12. The label 70 surrounds some frames of the cover frame 50 and improves the connecting force between the bare cell 10 and the cover frame 50. A label 70 may has a base member provided with an adhesive layer. In this embodiment, the base member is formed of polypropylene or polyethylene.

Hereinafter, an embodiment of a manufacturing process of the battery pack 10 will be described.

The bare cell 10, of which manufacture has been finished, is tested, and the insulator 20 is attached to certain sides of the bare cell 10. The insulator 20 is attached at least to the curved surface 11 of the bare cell 10.

Subsequently, the holder case 30 is attached to the curved surface 11 of the bare cell 10 with the insulator 20 optionally interposed therebetween. The length of the holder case 30 is adjusted to correspond to the size of the bare cell 10. The curved surface 302 of the holder case 30 is seated on the curved surface 11 of the bare cell 10. Then, the protection circuit board 40 is connected to the holder case 30.

Subsequently, the cover frame 50 is connected to the holder case 30 to cover the protection circuit board 40. The first and second connecting portions 327a and 327b of the cover frame 50 may be connected to the first and second connecting portions 317a and 317b of the holder case 30, respectively.

Subsequently, the bottom insulator 60 is attached to the side opposite to the curved surface 11 of the bare cell 10. The label 70 for the outer case is attached to the bare cell 10 and/or the cover frame 50. The connecting force between the bare cell 10 and the cover frame 50 is improved by the label 70. The water sensitive paper 80 is attached to the cover frame 50 and a functional test of the cell is performed.

According to some embodiments, the protection circuit board 40 may be first connected to the holder case 30. In this case, the length of the holder case 30 may be determined by a sliding connection structure. The length of the holder case 30 is based on the fixed interval between the first and second connecting portions of the protection circuit board 40. The interval between the first and second connecting portions of the protection circuit board 40 may depend on the length of the bare cell 10.

According to some embodiments, the interval between the first and second connecting portions 327a and 327b of the cover frame 50 may depend on the length of the bare cell 10. In this case, the length of the holder case 30 connected to the cover frame 50 may be determined by the sliding connection structure. In such embodiments, the holder case 30 connected to the protection circuit board 40 may be first connected to the cover frame 50 and subsequently attached to the curved surface 11 of the bare cell 10.

A holder case applicable to the battery pack of these embodiments is further described below.

Figure 3:
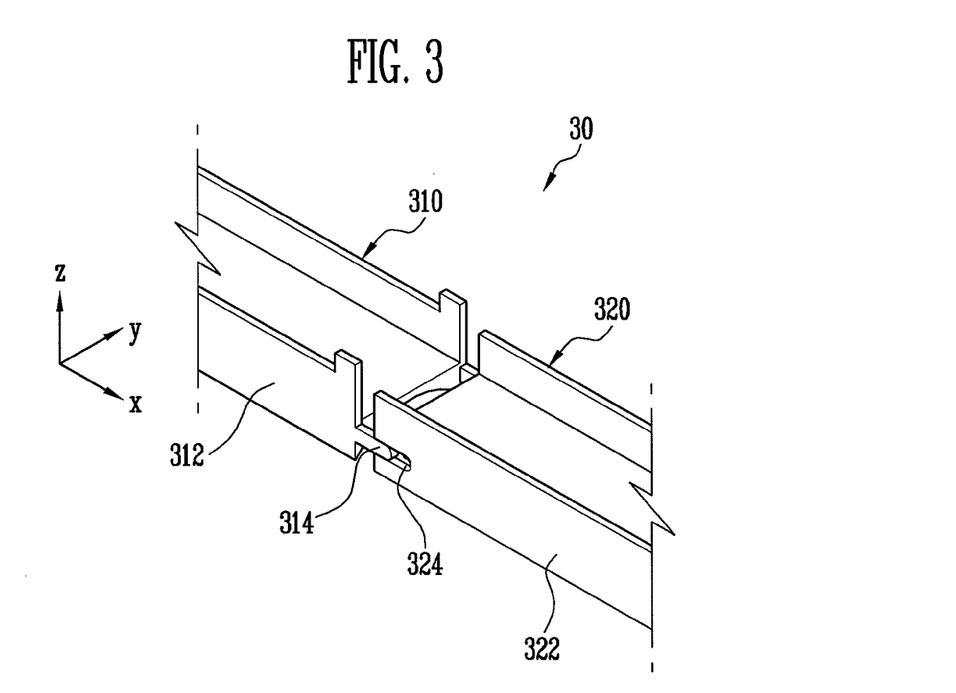
FIG. 3 is a partial perspective view of a holder case for a battery pack according to an embodiment.
Figure 4:
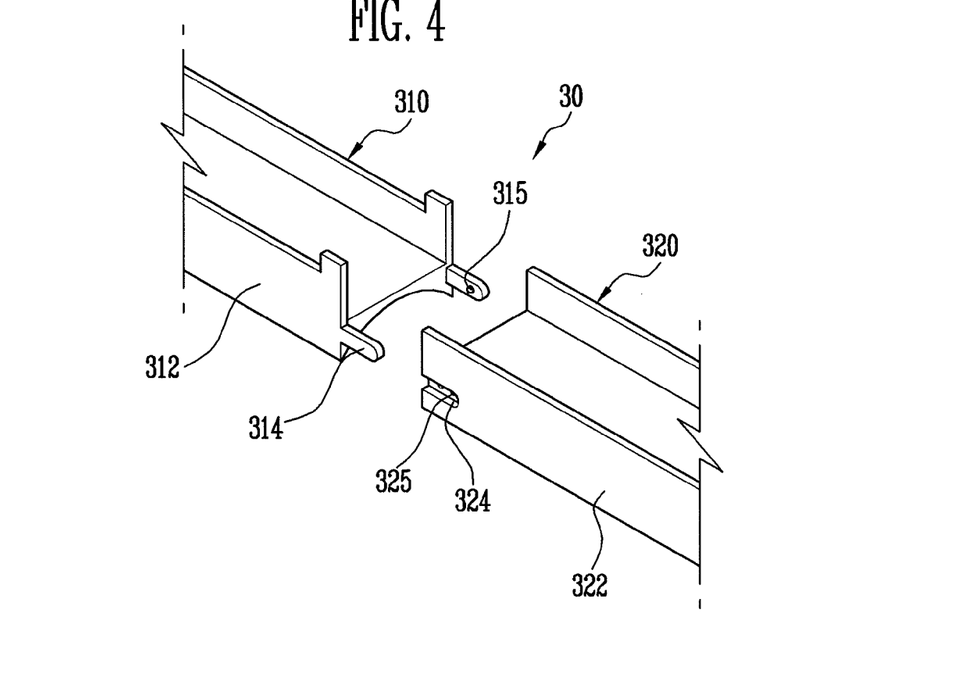
FIG. 4 is an exploded perspective view of the holder case of FIG. 3.
Figure 5:
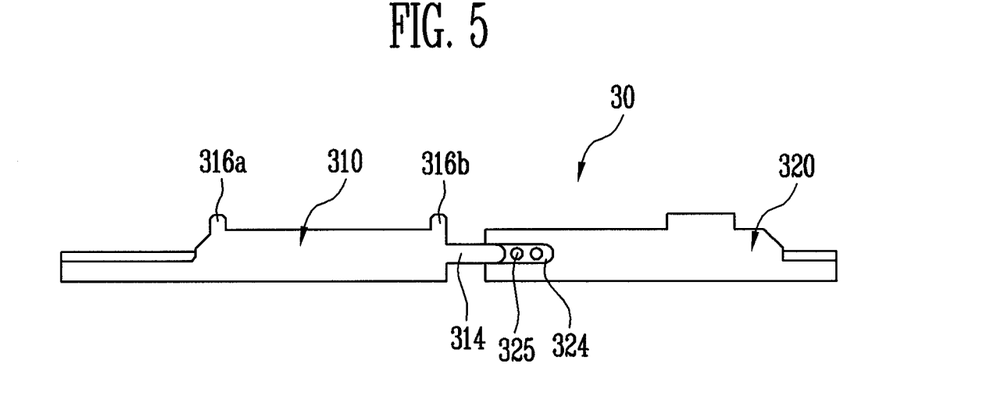
FIG. 5 is a side view of the holder case of FIG. 3.

FIG. 3 is a partial perspective view of a holder case for a battery pack. FIG. 4 is an exploded perspective view of the holder case of FIG. 3. FIG. 5 is a side view of the holder case of FIG. 3.

As shown in FIGS. 3 and 4, the holder case 30 includes a first holder case 310 and a second holder case 320. The first and second holder cases 310 and 320 may be connected to each other and may be disconnected from each other.

The first holder case 310 includes a body 312 and a first connecting portion 314. The second holder case 320 includes a body 322 and a second connecting portion 324. The first and second connecting portions 314 and 324 have a multi-step connection structure.

For example, the multi-step connection structure may include a first guide portion 314 in the first holder case 310 and a second guide portion 324 in the second holder case 320. In this embodiment, the first guide portion 314 protrudes toward the second holder case 320, and the second guide portion 324 allows the first guide portion 314 to be inserted therein. The multi-step connection structure may further include a projection 315 protruding from the first guide portion 314 and a plurality of holes 325 in the second guide portion 324. The plurality of holes 325 may be spaced apart from one another at a predetermined interval in the concave-shaped second guide portion 324 with a predetermined length. According to the multi-step connection structure, the projection 315 of the first holder case 310 is selectively inserted into any one of the holes 325 of the second holder case 320, so that the entire length of the holder case 30 can be varied.

As illustrated in FIG. 5, the holder case 30 may have first and second substrate connecting portions 316a and 316b for connection with the protection circuit board (see 40 of FIGS. 1B and 2). In this embodiment, the first and second substrate connecting portions 316a and 316b are formed to be spaced apart from each other at a predetermined interval.

Figure 6A:
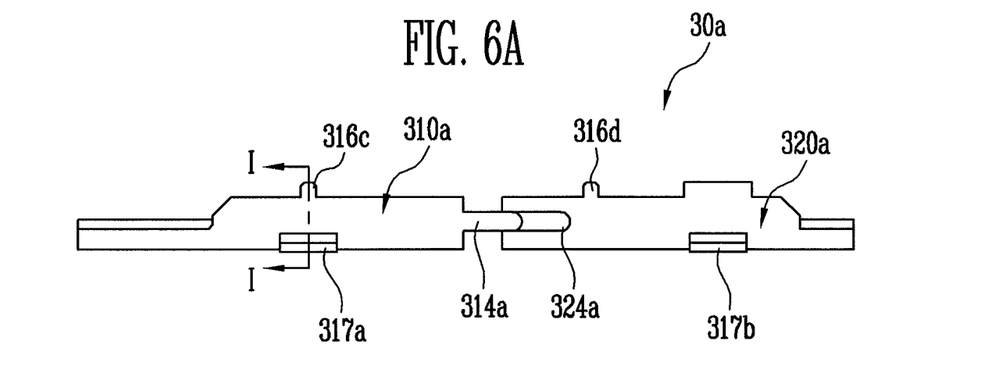
FIG. 6A is a side view of a holder case for a battery pack according to an embodiment.
Figure 6B:
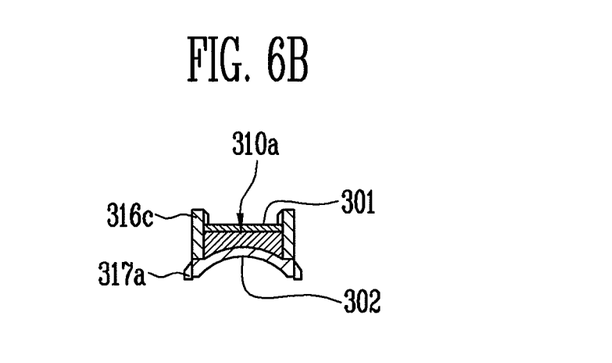
FIG. 6B is a sectional view taken along line I-I of the holder case of FIG. 6A.

FIG. 6A is a side view of a holder case for a battery pack according to some embodiments. FIG. 6B is a sectional view taken along line I-I of the holder case of FIG. 6A.

Referring to FIGS. 6A and 6B, the holder case 30a may include first and second holder cases 310a and 320a that may be disassembled from each other and assembled or reassembled into a single holder case.

The holder case 30a includes the first holder case 310a. The holder case 30a also includes a first connecting portion 314a in the first holder case 310a and a concave-shaped second connection portion 324a in the second holder case 320a. In this embodiment, the first connecting portion 314a protrudes toward the second holder case 320a, and the second connecting portion 324a allows the first connecting portion 314a to be connected thereto. The first and second connecting portions 314a and 324a have a sliding connection structure. The sliding connection structure includes a structure in which the first connecting portion 314a can slidably move in the second connecting portion 324a when the first and second holder cases 310a and 320a are connected to each other.

The holder case 30a may further include first and second substrate connecting portions 316c and 316d for connection with the protection circuit board (see 40 of FIG. 2). In this embodiment, the first substrate connecting portion 316c is included in the first holder case 310a, and the second substrate connecting portion 316d is included in the second holder case 320a. In this case, the length of the holder case 30a may be based on the distance between the first and second connecting portions of the protection circuit board. That is, when the distance between the first and second connecting portions of the protection circuit board is varied based on the length of the bare cell, the holder case 30a of this embodiment has a selectable length corresponding to the distance between the first and second connecting portions of the protection circuit board. Accordingly, the holder case 30a can be applied to bare cells having various lengths.

The holder case 30a may further include first and second cover connecting portions 317a and 317b for connection with the cover frame (see 50 of FIG. 2). In this embodiment, the first cover connecting portion 317a is included on the first holder case 310a, and the second cover connecting portion 317b is included on the second holder case 320a. In this embodiment, the length of the holder case 30a may be determined based on the distance between the first and second connecting portions of the cover frame. Accordingly, even though the distance between the first and second coupling portions of the cover frame corresponds to the length of the bare cell, the holder case 30a has a length corresponding to the distance between the first and second connecting portions of the cover frame. Consequently, the holder case 30a can be applied to bare cells having difference lengths.

The holder case 30a may further include a first side 301 facing the protection circuit board and a second side 302 facing the bare cell (see FIG. 6B). The second side 302 may be formed in the shape of a curved surface corresponding to the curved surface of the bare cell.

Figure 7:
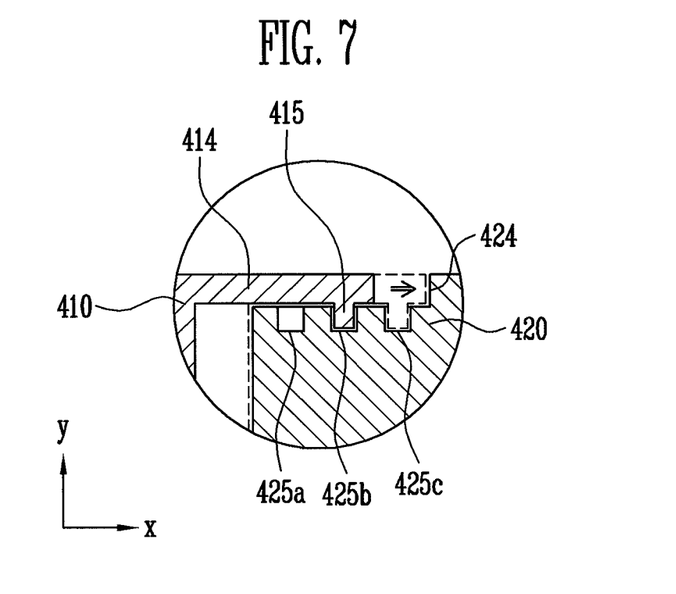
FIG. 7 is a partial sectional view illustrating the connection structure of a holder case according to an embodiment.

FIG. 7 is a partial sectional view illustrating a connection structure of a holder case according to some embodiments.

Referring to FIG. 7, the holder case includes first and second holder cases 410 and 420 that may be disassembled from each other and assembled into a single holder case.

The first holder case 410 has a first connecting portion 414 and the second holder case 420 has a second connecting portion 424. The first holder case 410 extends toward the second holder case 420, and the second holder case 420 allows the first holder case 410 to be connected thereto.

The first connecting portion 414 comprises a body 414 and a projection 415 protruding from one surface of the body 414. The second connecting portion 424 includes three grooves or openings 425a, 425b and 425c formed to be spaced apart from one another.

The projection is inserted into any one of the three grooves 425a, 425b and 425c. For example, when assuming that the length of the bare cell is "A", the projection 415 may be inserted into the middle groove 425b. When assuming that the length of the bare cell is "B" shorter than "A", the projection 415 may be inserted the right groove 425c. As described above, according to the connection structure of the holder case of this embodiment, the projection 415 of the first holder case 410 is inserted into any one of the grooves of the second holder case 420, so that the entire length of the holder case can be selected.

The connection structure of the holder case of this embodiment may correspond to the multi-step connection structure of the holder case 30 of FIGS. 3 to 5.

The connection structure of the holder case of this embodiment is formed on the left and right sides of the first and second holder cases. However, the present invention is not limited thereto. For example, as illustrated in the following FIGS. 8A and 8B, the connection structure of the holder case may be formed on the top and bottom sides of the first and second holder cases.

Figure 8A:
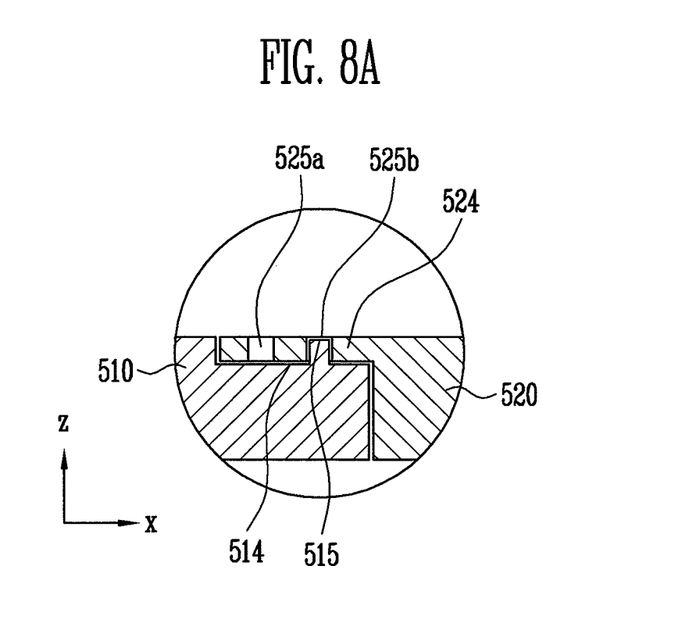
FIGS. 8A and 8B are views illustrating the connection structure of a holder case according to an embodiment.
Figure 8B:
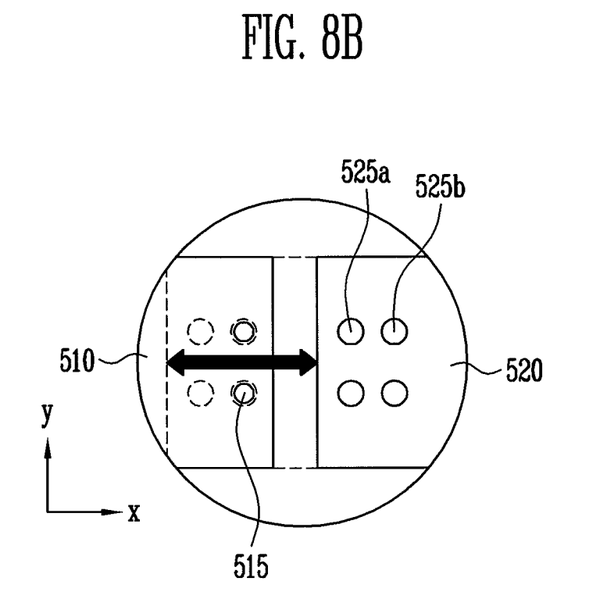

FIGS. 8A and 8B are views illustrating the connection structure of a holder case according to some embodiments.

Referring to FIGS. 8A and 8B, the holder case includes first and second holder cases 510 and 520 that may be disassembled from each other and assembled into a single holder case.

The holder case of this embodiment has a concave-shaped first connecting portion 514 in the first holder case 510 and a second connecting portion 524 in the second holder case 520. The first connecting portion 514 is formed on one side of the first holder case 510, and the second connecting portion 524 extends toward the first holder case 510.

The first connecting portion 514 has a projection 515 formed therein. The second connecting portion 524 has a plurality of grooves or holes 525a and 525b spaced apart from one another at a predetermined interval. The plurality of grooves 525a and 525b are arranged in at least one row.

When the first and second connecting portions 514 and 524 are connected to each other, the projection 515 may be inserted into at least one first groove 525a in a first row, or may be inserted into at least one second groove 525b in the first row. According to the connection structure, the projection 515 of the first holder case 510 is inserted into any one of the grooves 525a and 525b of the second holder case 520, so that the entire length of the holder case can be varied.

While certain exemplary embodiments have been described, it is to be understood that the invention is not limited to the disclosed embodiments, but, on the contrary, is intended to cover various modifications and equivalent arrangements.

What is claimed is:

1. A holder case for a battery pack, the holder case comprising:
    a first holder case having a first connecting portion; and
    a second holder case having a second connecting portion configured to engage the first connecting portion, wherein the second connecting portion is connected to the first connecting portion in one of a plurality of selectable configurations, and wherein one of the first and second holder cases has at least one substrate connecting portion connected with a connecting portion of a protection circuit board.

2. The holder case according to claim 1, wherein the first and second connecting portions have a multi-step connection structure so that the length of the holder case is variable in the length direction thereof.

3. The holder case according to claim 1, wherein the first and second connecting portions have a plurality of grooves in one of the first and second holder cases and at least one projection in the other of the first and second holder cases, wherein the plurality of grooves are spaced apart from one another, and the projection is engaged with one of the grooves.

4. The holder case according to claim 1, wherein one of the first and second holder cases has at least one cover connecting portion connected with a connecting portion of a cover frame.

5. A holder case for a battery pack, the holder case comprising:
    a first holder case having a first connecting portion; and
    a second holder case having a second connecting portion configured to engage the first connecting portion, wherein the second connecting portion is connected to the first connecting portion in one of a plurality of selectable configurations, and wherein the first holder case comprises a first substrate connecting portion connected with a first connecting portion of a protection circuit board, and the second holder case has a second substrate connecting portion connected with a second connecting portion of the protection circuit board.

6. The holder case according to claim 1, wherein the first holder case has a first cover connecting portion connected with a first connecting portion of a cover frame, and the second holder case has a second cover connecting portion connected with a second connecting portion of the cover frame.

7. The holder case according to claim 6, wherein the first and second connecting portions have a first sliding portion in one of the first and second holder cases and a second sliding portion in the other of the first and second holder cases, and the first and second sliding portions are slidably connected.

8. The holder case according to claim 1, wherein at least one of the first and second holder cases has a curved surface corresponding to one side of a bare cell.

9. The holder case according to claim 1, wherein the first and second holder cases are formed of a thermoplastic resin.

10. The holder case according to claim 1, wherein the second connecting portion is detachably connected to the first connecting portion.

11. The holder case according to claim 1, wherein each of the selectable configurations has a different length.

12. A battery pack comprising:
    a bare cell;
    a holder case connected to the bare cell, the holder case comprising:
        a first holder case comprising a first connecting portion; and
        a second holder case comprising a second connecting portion selectively connected to the first connecting portion;
    a protection circuit board connected to the holder case, wherein the second connecting portion is connected to the first connecting portion in one of a plurality of selectable configurations;
    a cover frame connected to the holder case to cover the protection circuit board.

13. The battery pack according to claim 12, wherein the bare cell has a rectangular parallelepiped shape having narrow sides and broad sides, and the holder case is connected to one of the narrow sides.

14. The battery pack according to claim 12, wherein the bare cell comprises:
    a can or pouch type outer case;
    an electrode assembly in the outer case; and
    an electrode terminal connected to the electrode assembly and exposed to the exterior of the outer case, wherein the electrode terminal is connected to the protection circuit board, and
an external terminal of the protection circuit board is exposed to the exterior through a hole in the cover frame.

15. The battery pack according to claim 12, further comprising an insulator positioned between the bare cell and the holder case.

16. The battery pack according to claim 12, wherein the second connecting portion is detachably connected to the first connecting portion.

17. The battery pack according to claim 12, wherein each of the selectable configurations has a different length.

* * * * *